(12) United States Patent
Lee et al.

(10) Patent No.: US 12,337,711 B2
(45) Date of Patent: Jun. 24, 2025

(54) APPARATUS FOR HOLDING CABLE FOR ELECTRIC VEHICLE CHARGER AND METHOD OF DRIVING SAME

(71) Applicants: HYUNDAI MOTOR COMPANY, Seoul (KR); KIA CORPORATION, Seoul (KR)

(72) Inventors: Woo Hyung Lee, Uijeongbu-si (KR); Su Hwan Cho, Seoul (KR); Young Tae Choi, Gwacheon-si (KR); Kwang Min Oh, Hwaseong-si (KR); Ho Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 284 days.

(21) Appl. No.: 18/106,111

(22) Filed: Feb. 6, 2023

(65) Prior Publication Data

US 2024/0131943 A1 Apr. 25, 2024
US 2024/0227596 A9 Jul. 11, 2024

(30) Foreign Application Priority Data

Oct. 25, 2022 (KR) .......................... 10-2022-0137881

(51) Int. Cl.
*B60L 53/35* (2019.01)
*B25J 19/06* (2006.01)
*B60L 53/18* (2019.01)

(52) U.S. Cl.
CPC .............. *B60L 53/35* (2019.02); *B25J 19/061* (2013.01); *B60L 53/18* (2019.02)

(58) Field of Classification Search
None
See application file for complete search history.

(56) References Cited

U.S. PATENT DOCUMENTS 12,275,322 B2 * 4/2025 Vepari ................... B60L 53/305
2017/0361717 A1 * 12/2017 Qin ........................ B60L 53/11
(Continued)

FOREIGN PATENT DOCUMENTS

CN  102123882 A  * 7/2011 .............. B60L 5/005
KR  10-2329170 B1  11/2021

OTHER PUBLICATIONS

Control.com, Online Forum Accessed through https://control.com/forums/threads/accuracy-belt-vs-screw.13309/ (Year: 2003).*
(Continued)

*Primary Examiner* — Wade Miles
*Assistant Examiner* — Arslan Azhar
(74) *Attorney, Agent, or Firm* — MCDONNELL BOEHNEN HULBERT & BERGHOFF LLP (57) ABSTRACT

An apparatus for holding a cable for an electric vehicle charger includes a cable holding unit configured to restrict a charging cable extended and connected to a charging coupler, and to ascend or descend to predetermined positions, a housing unit mounted in a manner that is rotatable along a leftward-rightward direction, the cable holding unit being accommodated inside the housing unit, a driving unit configured to provide drive power for enabling the cable holding unit to ascend and descend and drive power for rotating the housing unit, and a control unit configured to control the driving unit in such a manner that the cabling holding unit and the housing unit are selectively driven when the charging coupler is removed from an electric vehicle charger or rests thereon.

13 Claims, 6 Drawing Sheets

(56) References Cited

U.S. PATENT DOCUMENTS

| | | | | |
|---|---|---|---|---|
| 2019/0193586 A1* | 6/2019 | Wu | ........................ | B60L 53/64 |
| 2020/0353833 A1* | 11/2020 | Kim | ...................... | H02J 7/0045 |
| 2022/0379759 A1* | 12/2022 | Harmon | .................. | B60L 53/30 |
| 2023/0106720 A1* | 4/2023 | Othman | .................. | B60L 53/16 |
| | | | | 320/109 |

OTHER PUBLICATIONS

KR102329170 B1 Translation (Year: 2020).*

* cited by examiner

APPARATUS FOR HOLDING CABLE FOR ELECTRIC VEHICLE CHARGER AND METHOD OF DRIVING SAME

CROSS REFERENCE TO RELATED APPLICATIONS

This application claims under 35 U.S.C. § 119(a) the benefit of priority to Korean Patent Application No. 10-2022-0137881 filed on Oct. 25, 2022, the entire contents of which are incorporated herein by reference.

BACKGROUND

(a) Technical Field

The present disclosure relates to an apparatus for holding a cable for an electric vehicle charger and a method of driving the apparatus for holding a cable for an electric vehicle charger. More particularly, the present disclosure relates to an apparatus for holding a cable for an electric vehicle charger, the apparatus being capable of driving a charging cable in an upward-downward (vertical) direction and in a leftward-rightward (horizontal) direction in order for the charging cable to have mobility, when a charging coupler is removed from the electric vehicle charger, and a method of driving the apparatus for holding a cable for an electric vehicle charger. The apparatus and the method are capable of improving convenience of charging and preventing damage to the charging cable.

(b) Background Art

Usually, a charging cable for an electric vehicle charging apparatus has a predetermined thickness, and a plurality of wires are built into the charging cable. For this reason, the charging cable has less flexibility and a heavy weight. Thus, the charging cable is not easy to handle.

Therefore, in a case where the electric vehicle charging apparatus performs charging, it is inconvenient to move a charging gun or a charging cable according to a location where an electric vehicle stops. Moreover, there is a concern that the charging cable will be damaged in a case where an excessive force is applied thereto.

A high-voltage electric current flows through the charging cable. For this reason, the risk of electric shock may occur in a case where there occurs damage to the charging cable due to entangling or the like of the charging cable.

This problem causes much inconvenience of use for a user because the location where the electric vehicle stops for charging is set to a specific location or direction. Moreover, in a case where a charging socket position varies from one electric vehicle to another, the user has to exercise considerable care. This increases further the inconvenience of use.

Accordingly, there is a need to develop an apparatus for charging the electric vehicle, the apparatus being capable of not only ensuring user convenience, but also providing mobility of the charging cable and convenience of charging and preventing the damage to the charging cable.

SUMMARY

An object of the present disclosure is to provide an apparatus for holding a cable for an electric vehicle charger, the apparatus being capable of driving a charging cable in an upward-downward (vertical) direction and in a leftward-rightward (horizontal) direction in order for the charging cable to have mobility, when a charging coupler is removed from the electric vehicle charger and of controlling driving of a cable holding unit in such a manner that the charging cable returns to an initial position thereof, when the charging coupler rests on the electric vehicle charger, and a method of driving the apparatus for holding a cable for an electric vehicle charger. The apparatus and the method are capable of improving convenience of charging and preventing damage to the charging cable.

According to an aspect of the present disclosure, there is provided an apparatus for holding a cable for an electric vehicle charger, the apparatus including a cable holding unit configured to restrict a charging cable extended and connected to a charging coupler, and to ascend or descend to predetermined positions, a housing unit mounted in a manner that is rotatable along a leftward-rightward direction, the cable holding unit being accommodated inside the housing unit, a driving unit configured to provide drive power for enabling the cable holding unit to ascend and descend and drive power for rotating the housing unit, and a control unit configured to control the driving unit in such a manner that the cabling holding unit and the housing unit are selectively driven when the charging coupler is removed from an electric vehicle charger or rests thereon.

In the apparatus, the cable holding unit may include a main body accommodated in the housing unit and connected to the driving unit, and a holding member connected to the main body, protruding out of the housing unit through an ascending and descending guide provided in the housing unit, and holding the charging cable.

In the apparatus, the driving unit may include a first driving unit connected to cable holding unit and configured to provide drive power for ascending and descending, and a second driving unit mounted on the housing unit and configured to provide drive power for independent rotating without any intervention of the electric vehicle charger.

In the apparatus, the first driving unit may include a ball screw, a transportation nut of the ball screw being connected to the cable holding unit and the cable holding unit being moved along a threaded portion of the ball screw, and a drive motor connected to the ball screw and configured to rotate the threaded portion and thus to move the transportation nut in the upward-downward direction, thereby enabling the connected cable holding unit to ascend and descend.

In the apparatus, the second driving unit may include: a rotation plate provided in a manner that is rotatable as a bottom of the housing unit; and a drive motor configured to rotate the rotation plate and thus to rotate the housing unit independently of the electric vehicle charger.

In the apparatus, when the charging coupler is removed from the electric vehicle charger, the drive motor may be disconnected from the rotation plate, and when the charging coupler is connected to an electric vehicle or rests on the electric vehicle charger, the drive motor may be connected to the rotation plate.

In the apparatus, when the charging coupler is removed from the electric vehicle charger, the control unit may control the driving unit in such a manner that the cable holding unit descends to a pre-stored setting position, and when the charging coupler is connected to an electric vehicle, the control unit may control the driving unit in such a manner that the cable holding unit is kept stationary at the setting position.

In the apparatus, the setting position may be set in a manner that varies according to a position of a charging port in each of a plurality of types of electric vehicles and then may be stored, and in response to user input, the type of electric vehicle that requires charging may be selected, and thus the control unit may control the driving unit in such a manner that the cable holding unit descends to the setting position.

In the apparatus, while the cable holding unit descends to the setting position, when a tension force exceeding a preset tension force is applied, the control unit may control the driving unit in such a manner that the cable holding unit stops descending and that an alarm is set off.

In the apparatus, when the charging coupler switches from a state of being removed from the electric vehicle charger to a state of resting thereon, the control unit may control the driving unit in such a manner that the cable holding unit ascends to a preset initial position thereof and that the housing unit is rotated to a preset initial position thereof.

According to another aspect of the present disclosure, there is provided a method of driving an apparatus for holding a cable for an electric vehicle charger, the method including a first step of acquiring information of an electric vehicle by user's inputting of a type of the electric vehicle, in a standby state for charging and determining, by a control unit, state information of a charging coupler, a second step of controlling, by the control unit, a driving unit in such a manner that a cable holding unit descends to a setting position, when it is determined that the charging coupler is removed, a third step of controlling, by the control unit, the driving unit in such a manner that the cable holding unit is kept stationary at a position to which the cable holding unit descends and that the housing unit is kept stationary at a position to which the housing unit is rotated, when it is determined that the charging coupler is connected to the electric vehicle, and a fourth step of controlling, by the control unit, the driving unit in such a manner that the cable holding unit and the housing unit return to initial positions thereof, respectively, when the charging coupler switches from a removed state to a resting-on state.

In the method, the setting position may be set in a manner that varies according to a position of a charging port in each of a plurality of types of electric vehicles and then may be stored.

In the method, in the second step, the control unit may control the driving unit in such a manner that the housing unit is freely rotatable by a user in a state where the cable holding unit descends.

In the method, in the second step, while the cable holding unit descends to the setting position, when a tension force exceeding a preset tension force is applied, the control unit may control the driving unit in such a manner that the cable holding unit stops descending.

According to the present disclosure, the charging cable is driven in the upward-downward direction and in the leftward-rightward direction in order for the charging cable to have mobility, when the charging coupler is removed from the electric vehicle charger, and the driving of the cable holding unit is controlled in such a manner that the charging cable returns to the initial position thereof, when the charging coupler rests on the electric vehicle charger. Thus, the effect of possibly improving the convenience of charging can be achieved.

According to the present disclosure, the information of the electric vehicle is acquired, and a distance to the charging port varies according to the type of the electric vehicle. Thus, the position to which the cable holding unit descends is selectively determined. Thus, the effect of possibly preventing the charging cable from being damaged due to the charging cable being dragged during charging can be achieved.

In addition, according to the present disclosure, while the cable holding unit descends, when it is detected that the tension force exceeds the preset tension force, the cable holding unit stops being driven, and the alarm is set off. Thus, the effect of possibly preventing the cable holding unit from malfunctioning can be achieved.

DETAILED DESCRIPTION

Embodiments of the present disclosure will be described in detail below with reference to the accompanying drawings.

An advantage and a feature of the present disclosure and a method of achieving the advantage and the feature will be apparent from the embodiment that will be described below in detail with reference to the accompanying drawings.

However, the present disclosure is not limited to the embodiments that will be disclosed below and will be practiced in various different forms. The embodiments are only provided to make a complete disclosure of the present disclosure and to provide a person of ordinary skill in the art to which the present disclosure pertains with definite notice as to the scope of the present disclosure. The scope of the present disclosure should be only defined in claims.

In addition, a detailed description of a well-known technology or the like related to the present disclosure, when determined as making the gist and nature of the present disclosure obfuscated, will be omitted.

Figure 1:
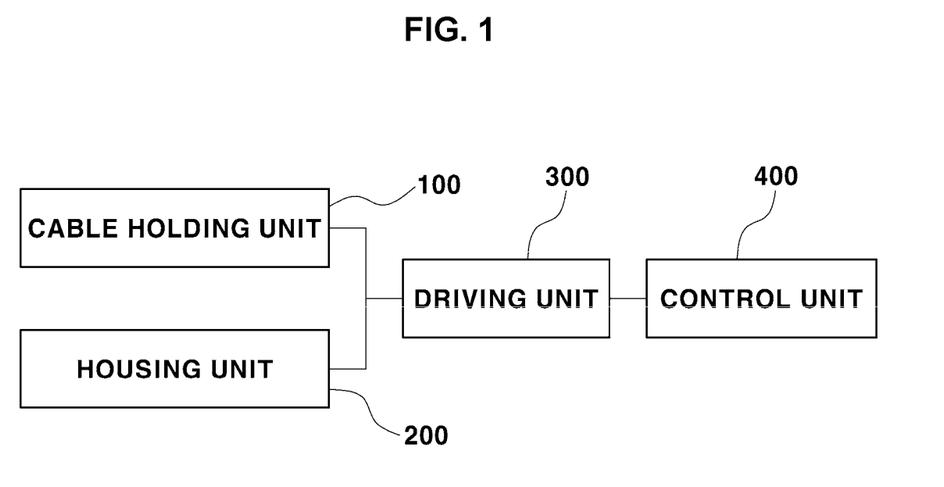
FIG. 1 is a block diagram schematically illustrating an apparatus for holding a cable for an electric vehicle charger according to a first embodiment of the present disclosure.
Figure 2:
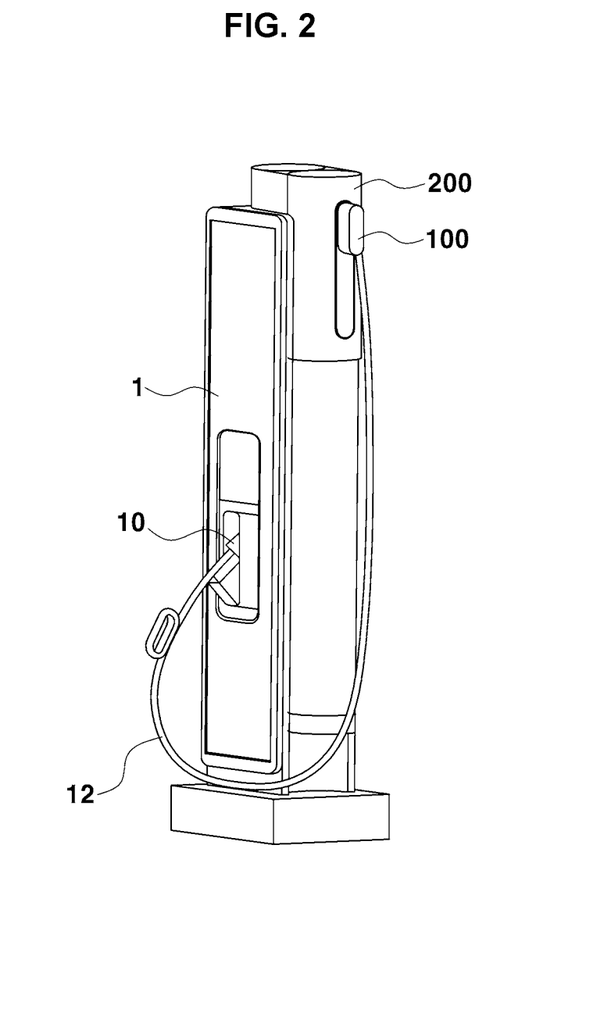
FIG. 2 is a view illustrating a structure of the apparatus for holding a cable for an electric vehicle charger according to the first embodiment of the present disclosure.

FIG. 1 is a block diagram schematically illustrating an apparatus for holding a cable for an electric vehicle charger according to a first embodiment of the present disclosure. FIG. 2 is a view illustrating a structure of the apparatus for holding a cable for an electric vehicle charger according to the first embodiment of the present disclosure.

Figure 3:
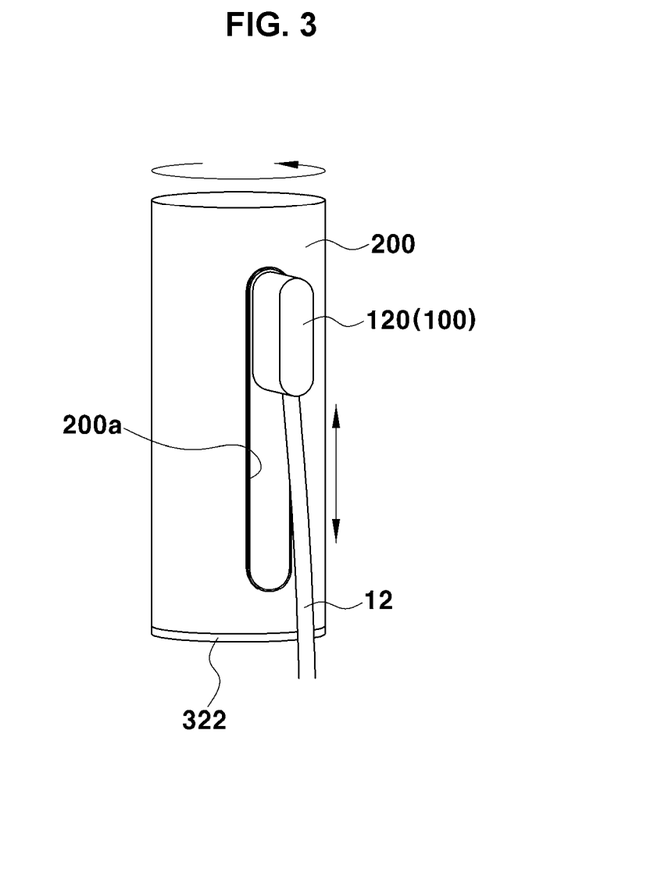
FIG. 3 is a view illustrating that a cable holding unit and a housing unit of the apparatus for holding a cable for an electric vehicle charger according to the first embodiment of the present disclosure are driven.
Figure 4:
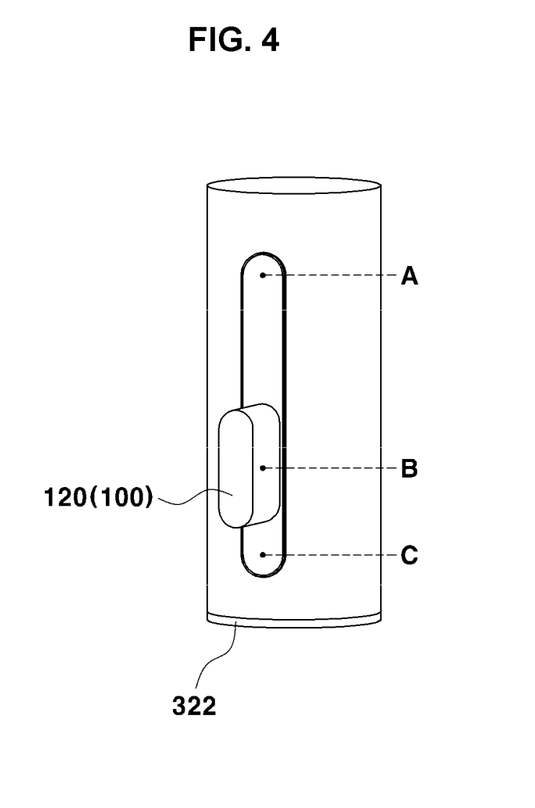
FIG. 4 is a view illustrating a setting position for the apparatus for holding a cable for an electric vehicle charger according to the first embodiment of the present disclosure.
Figure 5:
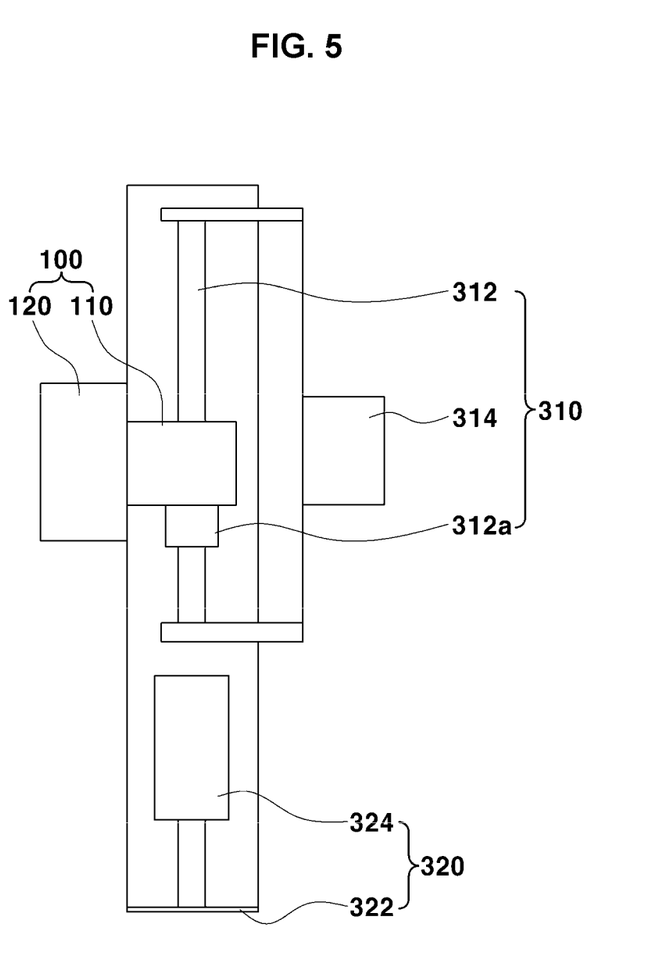
FIG. 5 is a view illustrating a driving unit of the apparatus for holding a cable for an electric vehicle charger according to the first embodiment of the present disclosure.

FIG. 3 is a view illustrating that a cable holding unit 100 and a housing unit 200 of the apparatus for holding a cable for an electric vehicle charger according to the first embodiment of the present disclosure are driven. FIG. 4 is a view illustrating a setting position for the apparatus for holding a cable for an electric vehicle charger according to the first embodiment of the present disclosure. FIG. 5 is a view illustrating a driving unit 300 of the apparatus for holding a cable for an electric vehicle charger according to the first embodiment of the present disclosure.

Usually, a charging cable 12 for an electric vehicle charger 1 has a large number of wiring lines built in and has a predetermined thickness. Because of this, the charging cable 12 weighs heavily. Thus, it is difficult for a user to use the charging cable 12.

Furthermore, when for charging, a charging coupler 10 is removed from the electric vehicle charger 1 and is moved, the charging cable 12 extends over a long distance and thus is brought into contact with the ground. Accordingly, the charging cable 12 may be damaged due to its friction with the ground. Moreover, the charging cable 12 may collide with an electric vehicle, and thus the electric vehicle may be damaged.

In order to solve this usual problem, as illustrated in FIG. 2, the cable holding apparatus holding the charging cable 12 may be configured separately from the electric vehicle charger 1.

To this end, the apparatus for holding a cable for an electric vehicle charger according to the first embodiment, as illustrated in FIG. 1, includes the cable holding unit 100, the housing unit 200, the driving unit 300, and a control unit 400.

The cable holding unit 100 is connected to the charging coupler 10 in such a manner as to hold the charging cable 12 extending over a predetermined distance and to be ascendable and descendable along an upward-downward (vertical) direction.

The cable holding unit 100 includes a main body 110 and a holding member 120.

The main body 110 is accommodated inside the housing unit 200 and is connected to the driving unit 300.

More specifically, the main body 110, as illustrated in FIG. 5, is mounted on a transportation nut 312a of a ball screw 312 constituting a first driving unit 310 inside the housing unit 200 in such a manner that the main body 110 is moved along a lengthwise direction of a threaded portion of the ball screw 312 when the transportation nut 312a is moved in the upward-downward direction.

Each of the ball screw 312 and the transportation nut 312a has the structure, as described above, which enables the main body 110 to be moved in the upward-downward direction, but is not limited thereto. Each of the ball screw 312 and the transportation nut 312a may also have a different structure that enables the main body 110 to be moved in the same manner.

The holding member 120, as illustrated in FIG. 3, is connected to the main body 110 in such a manner as to protrude out of the housing unit 200 through an ascending and descending guide 200a provided in the housing unit 200, and to hold the charging cable 12 inside.

Therefore, when the main body 110, as described above, is moved in the upward-downward direction, the holding member 120 ascends and descends along the ascending and descending guide 200a, together with the main body 110. Thus, a height of the charging cable 12 at the electric vehicle charger 1 may be adjusted.

The cable holding unit 100 is accommodated inside the housing unit 200, and the housing unit 200 is rotatable along a leftward-rightward (horizontal) direction.

The housing unit 200 may be configured in a manner that is rotatable in the leftward-rightward direction in a state of being mounted on the electric vehicle charger 1, but in a manner that is freely rotatable (refer to FIG. 3).

That is, when the charging coupler 10 is removed from the electric vehicle charger 1, the housing unit 200 is disconnected from a second driving unit 320 and thus may be selectively freely rotatable. In addition, when the charging coupler 10 is connected to the electric vehicle or rests on the electric vehicle charger 1, the housing unit 200 is connected to the second driving unit 320. Thus, by moving a drive motor 324, the housing unit 320 may be kept stationary or may be rotated in the leftward-rightward (horizontal) direction.

The driving unit 300 provides drive power for enabling the cable holding unit 100 to ascend and descend and drive power for rotating the housing unit 200.

To this end, the driving unit 300 includes the first driving unit 310 and the second driving unit 320. The first driving unit 310 is connected to the cable holding unit 100 and thus provides the drive power for enabling the cable holding unit 100 to ascend and descend. The second driving unit 320 is mounted on the housing unit 200 and thus provides the drive power for rotating the housing unit 200 independently of the electric vehicle charger 1.

In this case, the first driving unit 310 includes the ball screw 312 and a drive motor 320. The first driving unit 310 is mentioned above as being involved in enabling the main body 110 to ascend and descend. Thus, a specific description of the first driving unit 310 is omitted.

In addition, the second driving unit 320 includes a rotation plate 322 and the drive motor 324. The rotation plate 322 is provided in a manner that is rotatable as a bottom of the housing unit 200. The drive motor 324 rotates the rotation plate 322 and thus rotates the housing unit 200 independently of the electric vehicle charger 1.

Accordingly, the second driving unit 320 is disconnected from the rotation plate 322 when the charging coupler 10 is removed from the electric vehicle charger 1 in such a manner that the housing unit 200 is selectively rotated freely or rotated under the control of the control unit 400. In addition, the second driving unit 320 is connected to the rotation plate 322 when the charging coupler 10 is connected to the electric vehicle or rests on the electric vehicle charger 1.

When the charging coupler 10 is removed from or rests on the electric vehicle charger 1, the control unit 400 controls the driving unit 300 in such a manner that the cable holding unit 100 and the housing unit 200 are selectively driven.

More specifically, when the charging coupler 10 is removed from the electric vehicle charger 1, the control unit 400 controls the driving unit 300 in such a manner that the cable holding unit 100 descends to a pre-stored setting position. When the charging coupler 10 is connected to the electric vehicle, the control unit 400 controls the driving unit 300 in such a manner that the cable holding unit 100 is kept stationary at the setting position.

The setting position here is set in a manner that varies according to a position of a charging port in each of a plurality of types of electric vehicles and then is stored. Preferably, as illustrated in FIG. 4, the setting positions may be set to positions A, B, and C, respectively, that correspond to 0 mm, 300 mm, and 450 mm, respectively, that are distances from the top of the ascending and descending guide 200a, and may be stored.

As an example, the Porsche Taycan has a charging port in a fender on the opposite side of a driver's seat, and thus the charging port is positioned relatively close to the electric vehicle charger 1. Because of this, the position A from the top of the ascending and descending guide 200a is stored as the setting position. Accordingly, although the charging cable 1 is not further released, charging may be easily performed.

As another example, Bongo and Porter electric vehicles manufactured by Kia Corp. have a charging port in the center portion of the lateral side in the direction of the driver's seat, and thus the charging port is positioned relatively remotely from the electric vehicle charger 1. Because of this, the position C from the top of the ascending and descending guide 200*a* is stored as the setting position. Accordingly, because the charging cable 1 is released to a relatively remoter location than in the case of the Porsche Taycan, charging may be easily performed, the charging may be easily performed.

As still another example, another electric vehicle may have a charging port in a rear portion of a fender on the opposite side of a driver's seat. Because of this, the position B from the top of the ascending and descending guide 200*a* is stored as the setting position.

When the charging cable 12 is released over a longer distance than is necessary, the charging cable 12 is brought into contact with the ground during charging. Thus, damage, contamination, or the like may occur to the charging cable 12. Moreover, an image of an exterior appearance of the charging cable 12 may also be spoiled. In addition, when the charging cable 12 is released to a relatively short distance, the charging coupler 10 or the electric vehicle may be damaged with an excessive tension force applied to the charging cable 12. These problems can be prevented by enabling the cable holding unit 100 to ascend and descend to the setting position selected according to the position of the charging port in each of the plurality of types of electric vehicles.

Although not illustrated, a proximity sensor for recognizing that the cable holding unit 100 is positioned at the position A, B, or C may be installed at each of the positions A, B, and C. A limit switch may be installed at each of the positions A, B, and C. In a case where the cable holding unit 100 ascends short of the position A and descends past the position C, the control unit 400 recognizes this through the limit switch and forces the cable holding unit 100 to be stationary by controlling the driving unit 300. Thus, the cable holding unit 100 and the housing unit 200 may be prevented from being damaged because the cable holding unit 100 ascends or descends over an excessively long distance.

In addition, while the cable holding unit 100 descends to the setting position, when a tension force exceeding a preset tension force is applied by the user to the charging cable 12, in a case where it is determined that, for example, the charging cable 12 is forced to be pulled or the like, the control unit 400 may control the driving unit 300 in such a manner that the cable holding unit 100 stops descending and may also control the driving unit 300 in such a manner that an alarm is accordingly set off.

When the charging coupler 10 switches from a state of being removed from the electric vehicle charger 1 to a state of resting on the electric vehicle charger 1, the control unit 400 controls the driving unit 300 in such a manner that the cable holding unit 100 ascends to a preset initial position thereof and the housing unit 200 is rotated to a preset initial position thereof.

That is, when the charging is finished and the charging coupler 10 rests on the electric vehicle charger 1, the control unit 400 controls the driving unit 300 in such a manner that the housing unit 200 moved by the free rotation to a position suitable for the charging is rotated to return to an initial position thereof. Thereafter, the control unit 400 controls the driving unit 300 in such a manner that the cable holding unit 100 also ascends to an initial position thereof, that is, to an upper portion of the ascending and descending guide 200*a*.

Accordingly, in a case where the electric vehicle charger 1 is successively used to charge another electric vehicle, the cable holding unit 100 descends from the initial position thereof and the housing unit 200 is rotated from the initial positions thereof. Then, a position for releasing the charging cable 12 is reset. Thus, the corresponding electric vehicle may be easily charged.

Figure 6:
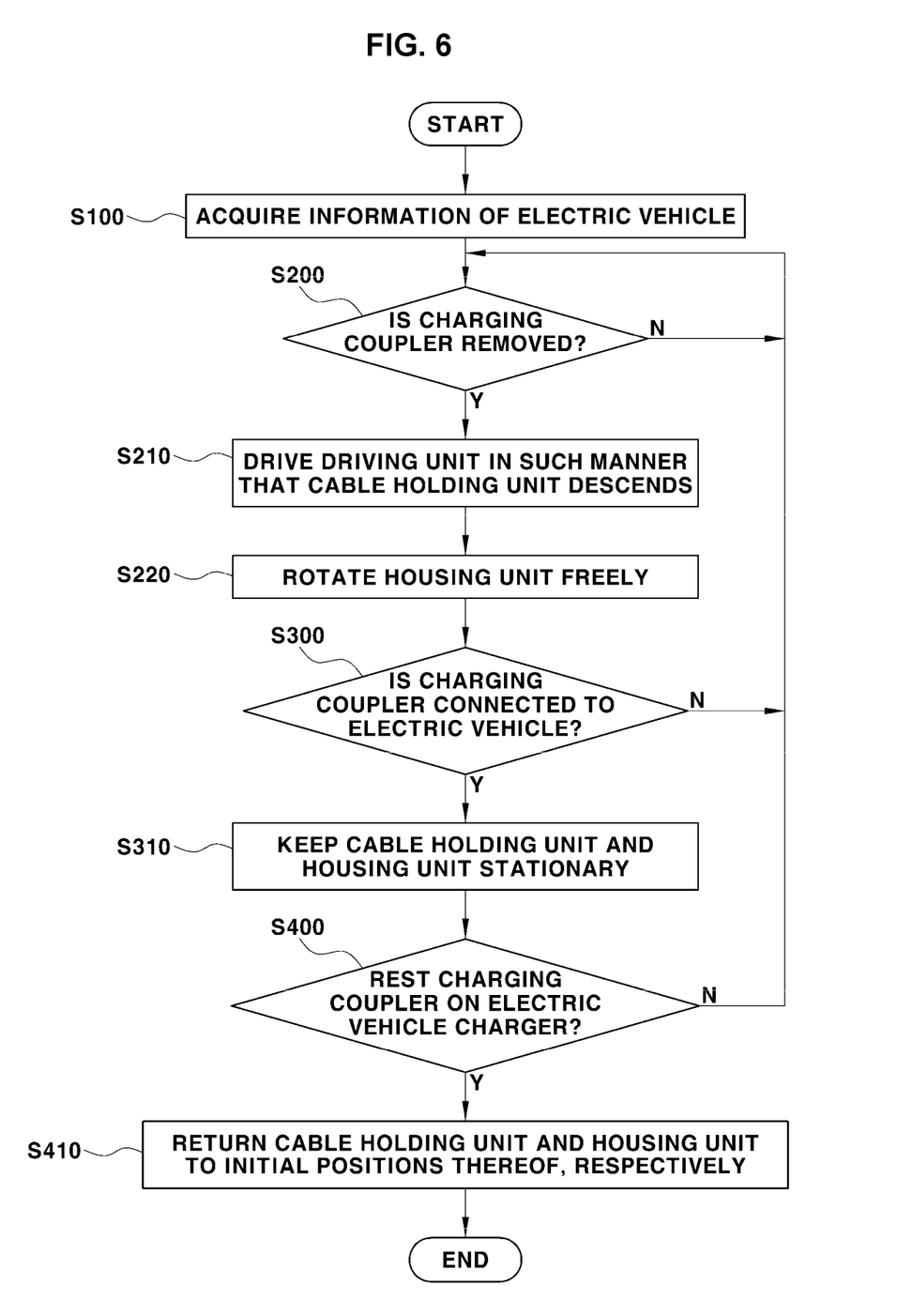
FIG. 6 is a flowchart sequentially illustrating steps of a method of driving the apparatus for holding a cable for an electric vehicle charger according to a second embodiment of the present disclosure.

FIG. 6 is a flowchart sequentially illustrating steps of a method of driving the apparatus for holding a cable for an electric vehicle charger according to a second embodiment of the present disclosure.

The steps of the method of driving the apparatus for holding a cable for an electric vehicle charger according to the second embodiment of the present disclosure will be sequentially described below with reference to FIG. 6.

In response to user input, a type of electric vehicle is selected in a standby state for charging, and thus information of the electric vehicle is acquired. The control unit 400 determines state information of the charging coupler 10 at S100.

At this point, the standby state for charging means that the cable holding unit 100 and the housing unit 200 are positioned at the initial positions thereof, respectively. In the standby state for charging, when the user inputs the type of electric vehicle along with an amount for a bill for charging an electric vehicle and then when the charging coupler 10 is removed, the control unit 400 performs control that varies with the type of electric vehicle.

In a state where the information of the electric vehicle is acquired in this manner from the electric vehicle charger 1 at S100, when it is determined that the charging coupler 10 is removed from the electric vehicle charger 1 at S200, the control unit 400 controls the driving unit 300 in such a manner that the cable holding unit 100 descends to the setting position that is set on the basis of each type of electric vehicle at S210.

Preferably, the setting position may be set in a manner that varies according to the charging port in each of the plurality of types of electric vehicles and may be stored. Preferably, as illustrated in FIG. 4, the setting positions may be set to the positions A, B, and C, respectively, that correspond to 0 mm, 300 mm, and 450 mm, respectively, that are the distances from the top of the ascending and descending guide 200*a* and may be stored.

The reason for setting and storing the setting positions to the positions A, B, and C, respectively, in this manner is specifically described above according to the first embodiment, taking as an example the types of electric vehicles, and thus the specific description thereof is omitted in the second embodiment.

At this point, in a state where the cable holding unit 100 descends at the position A, B, or C, under the control of the control unit 400, the housing unit 200 and the second driving unit 320 are disconnected from each other, and thus the cable holding unit 100 may be freely rotated independently of the housing unit 200 at S220.

Therefore, the user can rotate the charging cable 12 released from the electric vehicle charger 1 toward the charging port in a manner that is positioned at a desired position. Thus, convenience of use can be improved.

When the charging cable 12 is released over a longer distance than is necessary, the charging cable 12 is brought into contact with the ground while the charging is performed. Thus, damage, contamination, or the like may occur to the charging cable 12. Moreover, the image of the exterior appearance of the charging cable 12 may also be spoiled. In addition, when the charging cable 12 is released to a relatively short distance and thus the housing unit 200 cannot be freely rotated, the charging coupler 10 or the electric vehicle may be damaged with the excessive tension force applied to the charging cable 12. These problems can be prevented by enabling the cable holding unit 100 to descend to the setting position selected according to the position of the charging port in each of the plurality of types of electric vehicles and to be freely rotated.

As described above, while the cable holding unit 100 descends to the setting position at S210, when the tension force exceeding the preset tension force is applied by the user to the charging cable 12, in the case where it is determined that, for example, the charging cable 12 is forced to be pulled or the like, the control unit 400 may control the driving unit 300 in such a manner that the cable holding unit 100 stops descending and may also control the driving unit 300 in such a manner that the alarm is accordingly set off toward the user. Thus, the cable holding unit 100 can be prevented from malfunctioning due to the charging cable 12.

When it is determined that the charging coupler 10 is connected to the electric vehicle for charging at S300, for stable charging, the driving unit 300 is controlled in such a manner that the cable holding unit 100 is forced to be kept positioned at a position to which the cable holding unit 100 descends and that the housing unit 200 is forced to be kept positioned at a position to which the housing unit 200 is rotated at S310. When it is determined that the charging coupler 10 is not connected to the electric vehicle at S300, it is determined that after the charging is subsequently finished, the charging coupler 10 switches from the state of being removed from the electric vehicle charger 1 to the state of resting on the electric vehicle charger 1. Thus, the driving unit 300 is controlled in such a manner that the cable holding unit 100 and the housing unit 200 return to the initial stages thereof, respectively, at S410.

Accordingly, in the case where the electric vehicle charger 1 is successively used to charge another electric vehicle, the cable holding unit 100 descends from the initial position thereof and the housing unit 200 is rotated from the initial positions thereof. Then, a position for releasing the charging cable 12 is reset. Thus, the corresponding electric vehicle may be easily charged.

According to the present disclosure, the charging cable is driven in the upward-downward direction and in the leftward-rightward direction in order for the charging cable to have mobility, when the charging coupler is removed from the electric vehicle charger, and the driving of the cable holding unit is controlled in such a manner that the charging cable returns to the initial position thereof, when the charging coupler rests on the electric vehicle charger. Thus, the effect of possibly improving the convenience of charging can be achieved.

According to the present disclosure, the information of the electric vehicle is acquired, and a distance to the charging port varies according to the type of the electric vehicle. Thus, the position to which the cable holding unit descends is selectively determined. Thus, the effect of possibly preventing the charging cable from being damaged due to the charging cable being dragged during charging can be achieved.

In addition, according to the present disclosure, while the cable holding unit descends, when it is detected that the tension force exceeds the preset tension force, the cable holding unit stops being driven, and the alarm is set off. Thus, the effect of possibly preventing the cable holding unit from malfunctioning can be achieved.

The embodiments of the present disclosure are described above only in an exemplary manner with reference to the drawings. It would be understandable to a person of ordinary skill in the art to which the present disclosure pertains that various modifications can be made to the embodiments and that some or all of the constituent elements of the embodiments described above may be selectively combined for configuration. Therefore, the proper scope of the present disclosure should be defined in the following claims.

The invention claimed is:

1. An apparatus for holding a cable for an electric vehicle charger, the apparatus comprising:
   a cable holding unit configured to restrict a charging cable extended and connected to a charging coupler, and to ascend or descend to predetermined positions;
   a housing unit rotatably mounted along a horizontal direction, the cable holding unit being positioned inside the housing unit;
   a driving unit configured to provide drive power for enabling the cable holding unit to ascend and descend, and for rotating the housing unit; and
   a control unit configured to control the driving unit so that the cabling holding unit and the housing unit are driven when the charging coupler is removed from an electric vehicle charger or when the charging coupler rests on the electric vehicle charger;
   wherein, when the charging coupler is removed from the electric vehicle charger, the control unit controls the driving unit so that the cable holding unit descends to a pre-determined setting position; and
   wherein the setting position is set in a manner that varies according to a position of a charging port in each of a plurality of types of electric vehicles, and then is stored.

2. The apparatus of claim 1, wherein the cable holding unit comprises:
   a main body positioned in the housing unit and connected to the driving unit; and
   a holding member connected to the main body, and protruding out of the housing unit through an ascending and descending guide provided in the housing unit, and holding the charging cable.

3. The apparatus of claim 1, wherein the driving unit comprises:
   a first driving unit connected to the cable holding unit and configured to provide drive power for ascending and descending; and
   a second driving unit mounted on the housing unit and configured to provide drive power for independent rotating without intervention of the electric vehicle charger.

4. The apparatus of claim 3, wherein the first driving unit comprises:
   a ball screw, a transportation nut of the ball screw being connected to the cable holding unit, and the cable holding unit being moved along a threaded portion of the ball screw; and
   a drive motor connected to the ball screw and configured to rotate the threaded portion and to move the transportation nut in a vertical direction, thereby enabling the connected cable holding unit to ascend and descend.

5. The apparatus of claim 3, wherein the second driving unit comprises:
   a rotation plate rotatably connected to a bottom of the housing unit; and a drive motor configured to rotate the rotation plate, and to rotate the housing unit independently of the electric vehicle charger.

6. The apparatus of claim 5, wherein, when the charging coupler is removed from the electric vehicle charger, the drive motor is disconnected from the rotation plate; and
wherein, when the charging coupler is connected to an electric vehicle or rests on the electric vehicle charger, the drive motor is connected to the rotation plate.

7. The apparatus of claim 1,
wherein, when the charging coupler is connected to an electric vehicle, the control unit controls the driving unit so that the cable holding unit is kept stationary at a setting position.

8. The apparatus of claim 1,
wherein in response to a user input, a type of electric vehicle that requires charging is selected, and the control unit controls the driving unit so that the cable holding unit descends to the setting position.

9. The apparatus of claim 8, wherein, while the cable holding unit descends to the setting position, when a tension force exceeding a preset tension force is applied, the control unit controls the driving unit so that the cable holding unit stops descending, and an alarm is set off.

10. The apparatus of claim 1, wherein, when the charging coupler switches from a state of being removed from the electric vehicle charger to a state of resting on the electric vehicle charger, the control unit controls the driving unit so that the cable holding unit ascends to a preset initial position, and the housing unit is rotated to a preset initial position.

11. A method of driving an apparatus for holding a cable for an electric vehicle charger, the method comprising:
a first step of acquiring information of an electric vehicle by a user's inputting of a type of the electric vehicle, in a standby state for charging, and determining, by a control unit, state information of a charging coupler;
a second step of controlling, by the control unit, a driving unit so that a cable holding unit descends to a setting position when it is determined that the charging coupler is removed;
a third step of controlling, by the control unit, the driving unit so that the cable holding unit is kept stationary at a position to which the cable holding unit descends, and a housing unit is kept stationary at a position to which the housing unit is rotated when it is determined that the charging coupler is connected to the electric vehicle; and
a fourth step of controlling, by the control unit, the driving unit so that the cable holding unit and the housing unit each return to initial positions when the charging coupler switches from a removed state to a resting-on state;
wherein the setting position is set that varies according to a position of a charging port in each of a plurality of types of electric vehicles, and is then is stored.

12. The method of claim 11, wherein in the second step, the control unit controls the driving unit in such a manner that the housing unit is freely rotatable by a user in a state where the cable holding unit descends.

13. The method of claim 11, wherein in the second step, while the cable holding unit descends to the setting position, when a tension force exceeding a preset tension force is applied, the control unit controls the driving unit so that the cable holding unit stops descending.

* * * * *